(12) United States Patent
Yamada et al.

(10) Patent No.: US 8,359,908 B2
(45) Date of Patent: Jan. 29, 2013

(54) SURFACE TEXTURE MEASURING DEVICE

(75) Inventors: Keiji Yamada, Hiroshima (JP); Norimichi Ota, Hiroshima (JP); Hideki Shindo, Hiroshima (JP)

(73) Assignee: Mitutoyo Corporation, Kanagawa (JP)

( * ) Notice: Subject to any disclaimer, the term of this patent is extended or adjusted under 35 U.S.C. 154(b) by 84 days.

(21) Appl. No.: 12/966,460

(22) Filed: Dec. 13, 2010

(65) Prior Publication Data

US 2011/0138895 A1    Jun. 16, 2011

(30) Foreign Application Priority Data

Dec. 16, 2009   (JP) ................................. 2009-285035

(51) Int. Cl.
*G01B 5/28*   (2006.01)
(52) U.S. Cl. ......................................... 73/105
(58) Field of Classification Search ........................ None
See application file for complete search history.

(56) References Cited

U.S. PATENT DOCUMENTS

| | | | |
|---|---|---|---|
| 2,404,143 A * | 7/1946 | Reason | ........................... 73/105 |
| 5,048,326 A | 9/1991 | Toida et al. | |
| 5,740,616 A | 4/1998 | Seddon et al. | |
| 6,397,667 B1 * | 6/2002 | Fujii et al. | ....................... 73/105 |
| 2011/0277543 A1 * | 11/2011 | Mies | ............................... 73/105 |

FOREIGN PATENT DOCUMENTS

| | | |
|---|---|---|
| DE | 4437033 | 4/1996 |
| EP | 2199732 | 6/2010 |
| JP | 2007-155696 | 6/2007 |
| JP | 2007-155696 A | 6/2007 |

OTHER PUBLICATIONS

Search report from E.P.O., mail date is Apr. 27, 2011.
U.S. Appl. No. 12/879,311 to Junsuke Yasuno et al., which was filed on Sep. 10, 2010.

* cited by examiner

*Primary Examiner* — Robert R Raevis
(74) *Attorney, Agent, or Firm* — Greenblum & Bernstein, P.L.C.

(57) ABSTRACT

A surface texture measuring device includes a rotation driving device configured to rotate a measured substance, a roughness detector including a stylus provided displaceably at a tip of a detector main body and at least one skid provided at the tip of the detector main body and in the proximity of the stylus and outputting displacement of the stylus based on the skid as an electric signal, and a detector driving device configured to drive a detector holder. The detector holder includes a guide member driven by the detector driving device, a slide member configured to hold the roughness detector and provided slidably in a displacement direction of the stylus to the guide member, and an urging member configured to urge the slide member so that the skid always comes in contact with the measurement face of the measured substance.

5 Claims, 11 Drawing Sheets

MEASURING RANGE

ROTATION

MEASURING RANGE

SURFACE TEXTURE MEASURING DEVICE

TECHNICAL FIELD

The present disclosure relates to a surface texture measuring device for measuring surface roughness of a measured substance. In particular, the present disclosure relates to a surface texture measuring device for measuring surface roughness of a measured substance with a large eccentricity amount and a large displacement amount on a measurement face, for example, the outer peripheral cam face of a plate cam (plane cam), the end face cam face of an end face cam (solid cam), etc.

RELATED ART

For example, to measure surface roughness of the outer peripheral cam face of a plate cam (plane cam), a roundness measuring device may be used for measurement.

Generally, the roundness measuring device includes a base, a rotation table provided for rotation with a vertical axis as the center on the base for placing a measured substance on an upper face, a column provided upright on the base, a moving up and down slider that can move up and down in an up and down direction along the column, a slide arm provided slidably in a direction orthogonal to the vertical axis for the moving up and down slider, and a roughness detector attached to the tip of the slide arm for outputting displacement of a stylus coming in contact with the measured substance as an electric signal. (For example, refer to Patent Document 1.)

To measure the surface roughness of the outer peripheral cam face of a plate cam using the roundness measuring device, the plate cam is positioned on the rotation table and the roughness detector is positioned so that stylus comes in contact with the outer peripheral cam face of the plate cam and in this state, the rotation table is rotated. Then, the stylus is displaced in response to the contour shape and the surface roughness of the outer peripheral cam face of the plate cam. Thus, if only the displacement corresponding to the surface roughness, of the displacement is taken out, the surface roughness of the outer peripheral cam face can be measured.

[Patent Document 1] Japanese Patent Laid-Open No. 2007-155696

However, in a case where the surface roughness of the cam face is measured using the roundness measuring device, the following problem occurs:

When the surface roughness of the cam face is measured using the roundness measuring device, as shown in FIGS. 10A and 10B, the measuring range of a roughness detector 30 namely, the displaceable range of a stylus 33 of the roughness detector 30 is small as compared with the eccentricity amount of a cam K, and thus the roughness detector 30 ranges over and the perimeter of the cam face cannot continuously be measured.

Thus, formerly, the perimeter of the cam face is divided into sections and the roughness detector must be again positioned from the beginning for each division section for measurement and thus much time for measurement and analysis is required.

SUMMARY

Exemplary embodiments of the present invention provide a surface texture measuring device that can efficiently measure surface roughness of a measurement face with a large eccentricity amount, etc., such as a cam.

A surface texture measuring device, according to an exemplary embodiment of the invention, comprises:

a rotation driving device configured to rotate a measured substance;

a roughness detector including a detector main body and a stylus provided displaceably at a tip of the detector main body and configured to come in contact with a measurement face of the measured substance; and a detector driving device including a detector holder configured to hold the roughness detector, and being configured to drive the detector holder in a direction of bringing the detector holder close to or away from the rotation driving device, wherein the roughness detector has at least one skid provided at the tip of the detector main body and in the proximity of the stylus and configured to come in contact with the measurement face of the measured substance, and the roughness detector outputs displacement of the stylus based on the skid as an electric signal, and wherein the detector holder includes a guide member driven by the detector driving device, a slide member configured to hold the roughness detector and provided slidably in a displacement direction of the stylus to the guide member, and an urging member configured to urge the slide member so that the skid always comes in contact with the measurement face of the measured substance.

According to such a configuration, the roughness detector is moved to the proximity of the measured substance by the detector driving device and is set in a state in which the stylus and the skid of the roughness detector are in contact with the measurement face of the measured substance and then the measured substance is rotated by the rotation driving device. Then, displacement of the stylus based on the skid, namely, the surface roughness of the measured substance with which the skid comes in contact is detected.

In the exemplary embodiment, the detector holder includes the guide member, the slide member holding the roughness detector, and an urging member for urging the slide member and thus the slide member is urged so that the skid always comes in contact with the measurement face of the measured substance. Therefore, if the measured substance is a measured substance with a large eccentricity amount, etc., of the measurement face, for example, even if it is a cam, follow-up operation of the slide member along the cam face is performed and continuous measurement can be conducted in a state in which the skid is always in contact with the cam face, so that the surface roughness of the cam face of the cam, etc., can be efficiently measured.

In the surface texture measuring device, the skid may include a pair of skids sandwiching the stylus and projecting in a projection direction of the stylus.

For example, to measure the surface roughness of the cam face of a cam K using the roundness measuring device, a skid 37 is attached to the tip of a roughness detector 30 as shown in FIG. 11. Since the skid 37 is offset in a table rotation axis direction relative to a stylus 33, if an attempt is made to measure all area in the axial direction of the cam face, the skid 37 drops out from the cam face in an end margin of the cam face and all area in the axial direction cannot be measured. That is, a measurement-impossible area occurs. If it is necessary to measure all area in the axial direction of the cam face, re-positioning of the cam K (positioning of the cam with the surface and the back reversed) becomes necessary and thus much time becomes necessary for the positioning work.

According to the exemplary embodiment, the skid includes a pair of skids sandwiching the stylus and projecting in the projection direction of the stylus. Thus, when the surface roughness is measured while the roughness detector is moved in the side-by-side direction of the stylus and the skids, one skid is always in contact with the measurement face in the proximity of the boundary of the measurement area, so that a measurement-impossible area can be prevented from occurring. Therefore, the measurement area can be enlarged without re-positioning the measured substance.

In the surface texture measuring device, a tip of one skid of the pair of skids may deviate in the displacement direction of the stylus from a tip of the other skid.

For example, when two skids exist at the same position, it is feared that the tips (contact points) of the two skids may shift to the measurement face of the measured substance during measuring and the measurement waveform may be affected.

According to the invention, the tip of one skid deviates in the displacement direction of the stylus from the tip of the other skid, so that only one skid always comes in contact with the measurement face of the measured substance during measuring and thus the adverse effect on the measurement waveform can be prevented.

In the surface texture measuring device, the detector holder may include a slide amount detector configured to detect a slide amount of the slide member.

According to such a configuration, the slide amount detector for detecting the slide amount of the slide member is provided, so that the contour shape of the measurement face of the measured substance can be found from the slide amount of the slide member detected in the slide amount detector. Therefore, if the measured substance is a cam, the surface roughness of the cam face and the contour shape of the cam face can be measured at the same time.

DETAILED DESCRIPTION

<Surface Texture Measuring Device>

Figure 1:
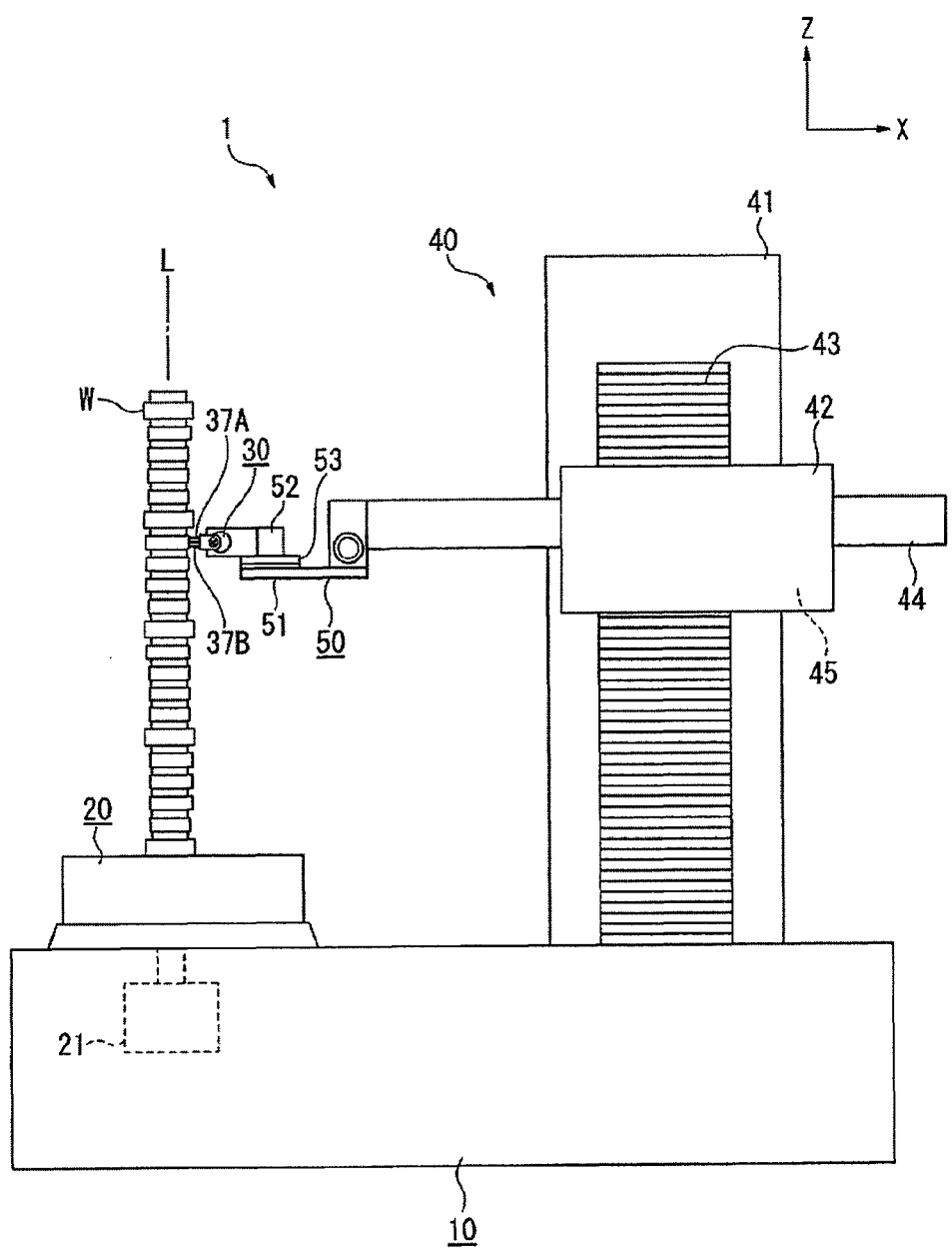
FIG. 1 is a front view to show a surface texture measuring device of an embodiment of the invention.

FIG. 1 is a front view to show a surface texture measuring device of an embodiment of the invention.

The surface texture measuring device of the embodiment is characterized in that skids 37A and 37B for coming in contact with the measurement face of a measured substance W are added to a roughness detector 30 and further a slide mechanism 53 for sliding the roughness detector 30 in a detection direction is installed in a general roundness measuring device 1.

Figure 6:
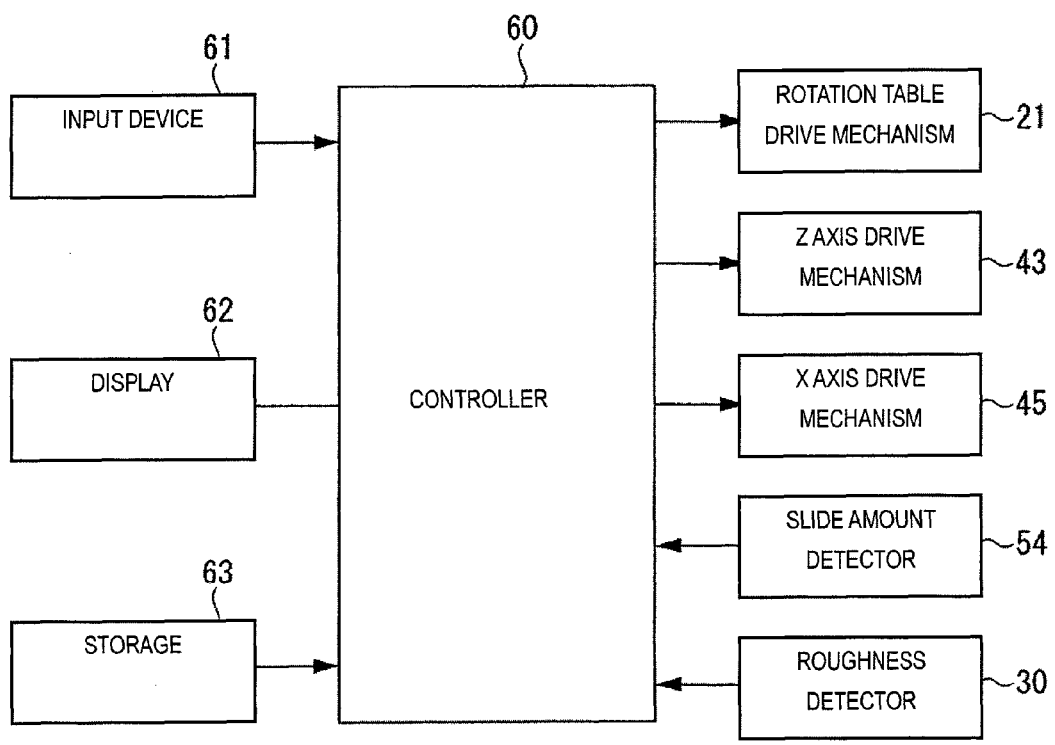
FIG. 6 is a block view to show a controller and peripheral mechanism of the embodiment of the invention.

The roundness measuring device 1 includes a base 10, a rotation table 20 provided for rotation with a vertical axis L as the center on one side of an upper face of the base 10 for placing the measured substance W (here, a cam shaft formed as a large number of plate cams overlap in an axial direction) on the upper face, the roughness detector 30, a detector driving device 40 for driving the roughness detector 30 in a vertical axis L direction (Z axis direction) and a direction orthogonal to the vertical axis L and bringing close to and away from the rotation table 20 (X axis direction), and a controller 60 (see FIG. 6).

The rotation table 20 is provided for rotation with the vertical axis L as the center by a rotation table drive mechanism 21 provided in the base 10. The rotation table drive mechanism 21 is implemented as a motor, a mechanism for transmitting rotation from a motor to the rotation table 20 through a decelerator, or the like. The rotation table 20 and the rotation table drive mechanism 21 make up a rotation driving device for rotating the measured substance W.

Figure 2:
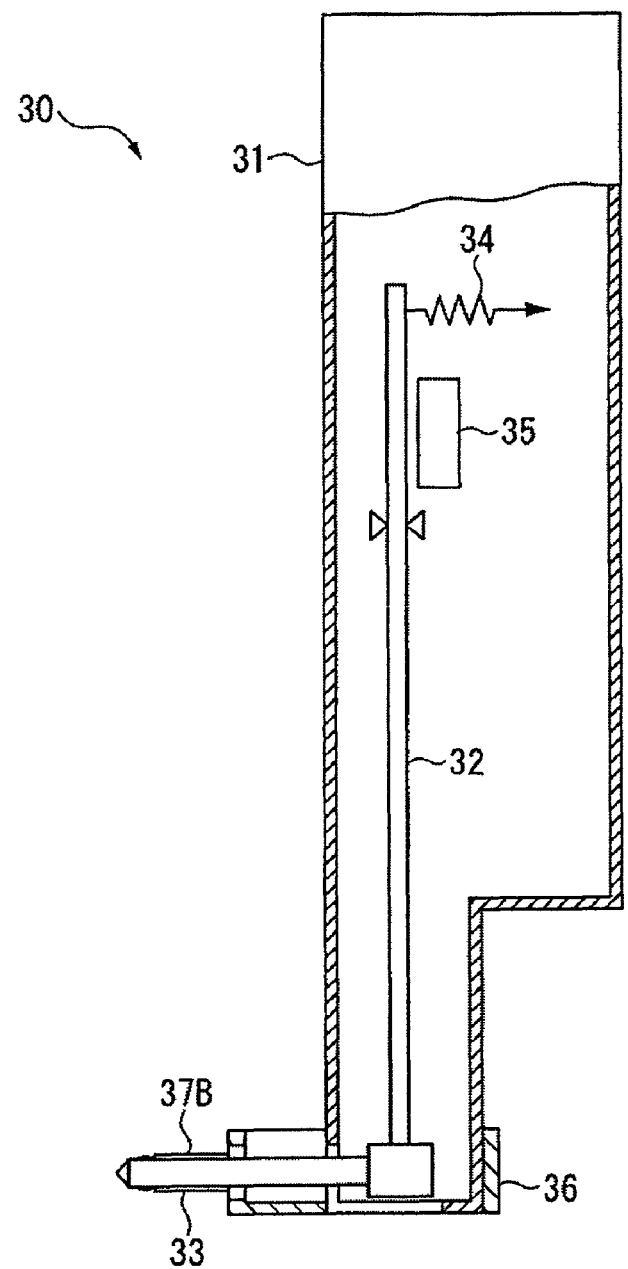
FIG. 2 is a sectional view to show a roughness detector of the embodiment of the invention.
Figure 3:
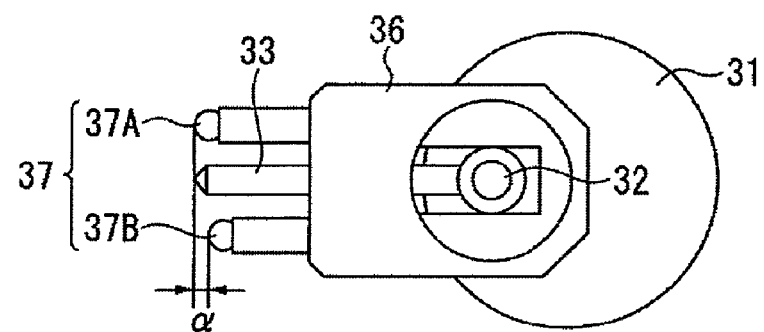
FIG. 3 is a front view to show the roughness detector of the embodiment of the invention.

The roughness detector 30 includes a cylindrical detector main body 31, an arm 32 with an intermediate section swingably supported in the detector main body 31, a stylus 33 provided at a tip of the arm 32, at the right angle to the arm 32, and projecting from the detector main body 31 for coming in contact with the measured substance W, a spring 34 as an urging member for urging the arm 32 in a direction in which the stylus 33 projects from the detector main body 31, and a detection section 35 for detecting displacement of the stylus 33 (namely, rock amount of the stylus 33) as an electric signal, as shown in FIGS. 2 and 3.

In the embodiment, further, a nose piece 36 is attached to the tip of the detector main body 31 and is provided with the skid 37 in the proximity of the stylus 33 for coming in contact with the measurement face of the measured substance W. Thus, displacement of the stylus 33 based on the skid 37 is output as an electric signal from the detection section 35 of the roughness detector 30.

The skid 37 includes a pair of skids 37A and 37B sandwiching the stylus 33 and projecting in the projection direction of the stylus 33. The tip of one skid 37A is placed deviating (back) a predetermined amount a in the displacement direction of the stylus 33 from the tip of the other skid 37B.

The detector driving device 40 includes a column 41 provided upright on an opposite side of the upper face of the base 10, a Z axis drive mechanism 43 for driving a moving up and down slider 42 in an up and down direction (Z axis direction) relative to the column 41, an X axis drive mechanism 45 for driving a slide arm 44 in a direction orthogonal to the vertical axis L relative to the moving up and down slider 42 and bringing close to and away from the rotation table 20 (X axis direction), and a detector holder 50 detachably attached to the tip of the slide arm 44.

The Z axis drive mechanism 43 may be of any structure if it is a mechanism that can drive the moving up and down slider 42 in the up and down direction although not shown in the figure. For example, it may be a feed mechanism having a ball screw shaft provided upright in the up and down direction on the column 41, a motor for rotating the ball screw shaft, and a nut member screwed to the ball screw shaft and joined to the moving up and down slider 42 or the like.

The X axis drive mechanism 45 may be of any structure if it is a mechanism that can drive the slide arm 44 in the direction orthogonal to the vertical axis L and bringing close to and away from the rotation table 20 (X axis direction) although not shown in the figure. For example, a rack may be formed along the length direction of the slide arm 44 and a pinion meshing with the rack, a motor for rotating the pinion, and the like may be provided in the moving up and down slider 42.

Figure 4:
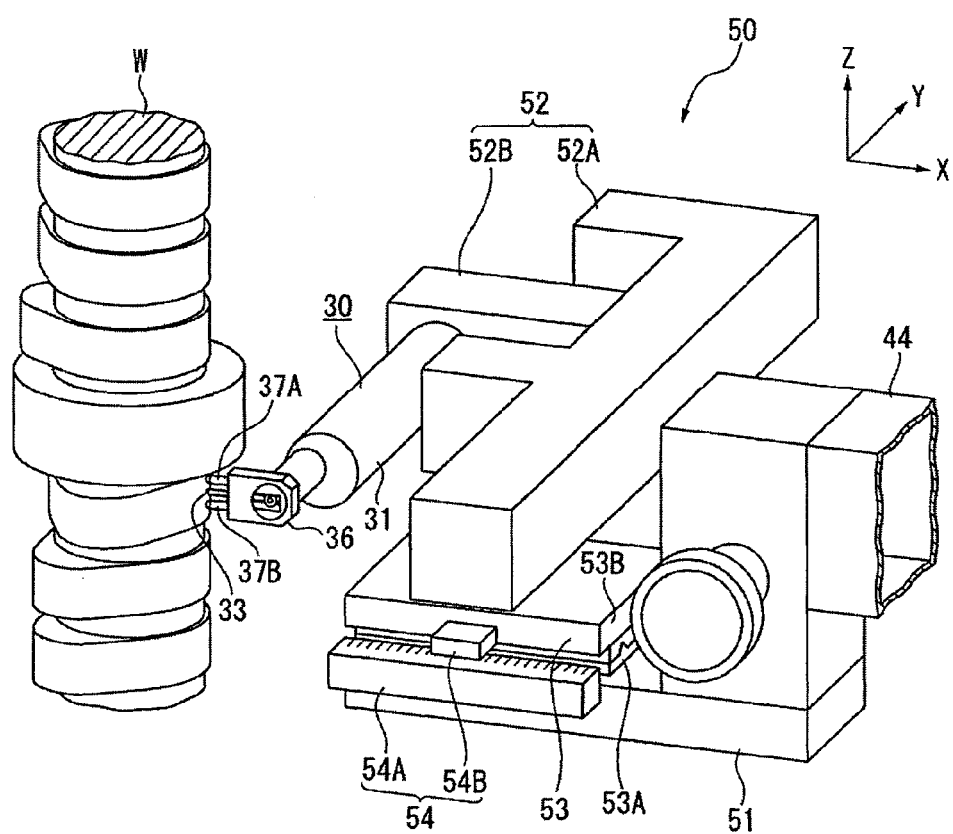
FIG. 4 is a perspective view to show the roughness detector and a detector holder of the embodiment of the invention.

The detector holder 50 includes a holder main body 51 detachably attached to the tip of the slide arm 44, a detector attachment member 52 to which the roughness detector 30 is attached, a slide mechanism 53 provided between the detector attachment member 52 and the holder main body 51, and a slide amount detector 54 for detecting the slide amount of the detector attachment member 52 (namely, the roughness detector 30) by the slide mechanism 53, as shown in FIG. 4.

The detector attachment member 52 includes an attachment base 52A and a moving piece 52B fixed to the tip of the attachment base 52A so that its position can be adjusted in a Y axis direction (direction orthogonal to the X, Z axis direction). A rear end of the roughness detector 30 is fixed to the moving piece 52B. That is, the roughness detector 30 is attached to the moving piece 52B with the stylus 33 and the skids 37A and 37B parallel with the X axis, and the tip positions of the stylus 33 and the skids 37A and 37B are fixed so that their positions can be adjusted in the Y axis direction by adjusting the position of the moving piece 52B.

Figure 5:
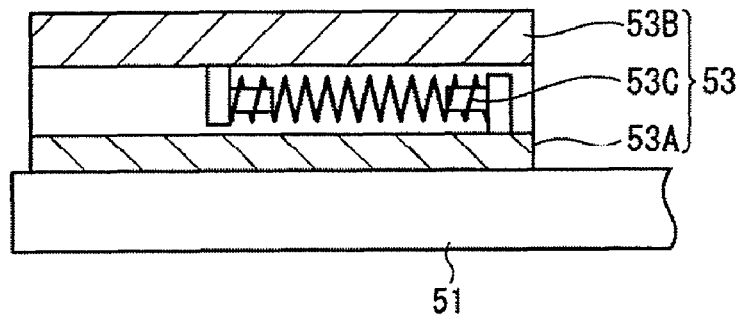
FIG. 5 is a sectional view to show a slide mechanism of the detector holder of the embodiment of the invention.

The slide mechanism 53 includes a guide member 53A fixed to an upper face of the holder main body 51, a slide member 53B for holding the roughness detector 30 through the detector attachment member 52 and provided slidably in the displacement direction (X axis direction) of the stylus 33 to the guide member 53A, and a compression coil spring 53C as an urging member provided between the guide member 53A and the slide member 53B for urging the slide member 53B in a direction in which the skids 37A and 37B always come in contact with the measurement face of the measured substance W, as shown in FIG. 5.

The slide amount detector 54 includes a scale 54A fixed to the holder main body 51 and a detection head 54B opposed to the scale 54A and fixed to the slide member 53B. The displacement detection system may be any of a photoelectric system, a capacitance system, an electromagnetic system, etc.

<Control System>

A control system includes a controller 60, an input device 61, a display 62, storage 63, etc.

A measuring program, measurement data read at the measuring time, and the like are stored in the storage 63.

In addition to the input device 61, the display 62, and the storage 63, the rotation table drive mechanism 21, the Z axis drive mechanism 43, the X axis drive mechanism 45, the slide amount detector 54, the roughness detector 30, and the like are connected to the controller 60. Although not shown in the figure, an angle detector for detecting the rotation angle of the rotation table 20 rotated by the rotation table drive mechanism 21, a displacement detector for detecting the displacement amounts of the moving up and down slider 42 and the slide arm 44 driven by the Z axis drive mechanism 43 and the X axis drive mechanism 45, and the like are also connected to the controller 60.

The controller 60 controls drive of the rotation table drive mechanism 21, the Z axis drive mechanism 43, and the X axis drive mechanism 45 in accordance with the measuring program stored in the storage 63 and reads and processes signals from the roughness detector 30 and the slide amount detector 54. Specifically, the controller 60 reads the signal from the roughness detector 30 and the signal from the slide amount detector 54 and finds surface roughness and the contour shape from the measurement results.

<Measurement Operation>

First, the roughness detector 30 is moved in a direction in which it approaches the measured substance W and the stylus 33 and the skid 37A of the roughness detector 30 are brought into contact with the measurement face of the measured substance W by driving the Z axis drive mechanism 43 and the X axis drive mechanism 45.

In this state, when a measuring command is given to the controller 60 by the measuring program, the rotation table 20 is rotated. At this time, the slide mechanism 53 is operated so that either the skid 37A or 37B always comes in contact with the measurement face of the measured substance W in response to the eccentricity amount of the measured substance W. This means that follow-up operation of the roughness detector 30 to the contour shape of the measured substance W is performed.

Then, the stylus 33 of the roughness detector 30 is displaced based on the skid 37A or 37B in contact with the measurement face of the measured substance W in response to the surface roughness of the measured substance W. Thus, the displacement of the stylus 33 is detected as an electric signal by the detection section 35 and then is read into the controller 60.

The controller 60 stores the read measurement data in the storage 63 and then computes the surface roughness from the data, displays the result on the display 62, and prints out the result as required.

Figure 7:
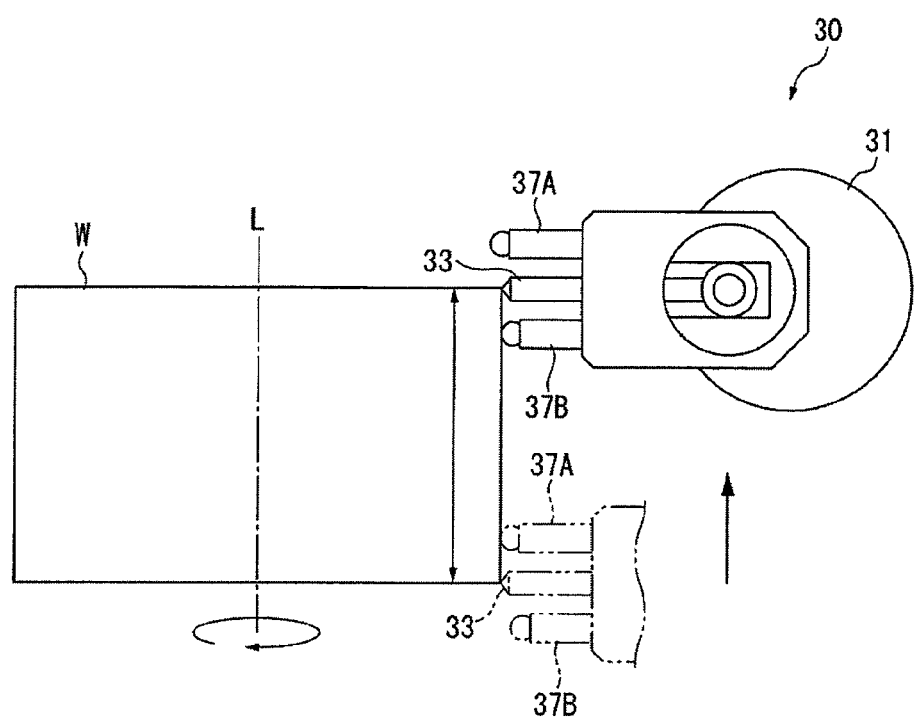
FIG. 7 is a view to show a state at measurement in the embodiment of the invention.
Figure 8:
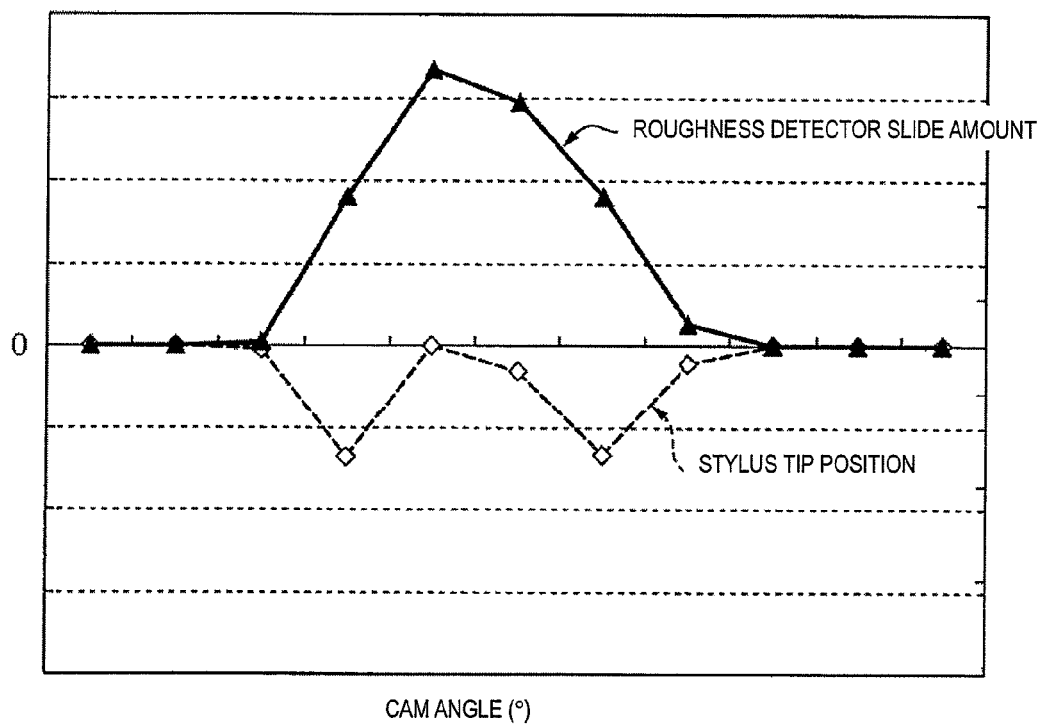
FIG. 8 is a view to show a measurement result in the embodiment of the invention.

To measure all area in the axial direction of the measurement face after the surface roughness of the measurement face of the measured substance W continuously in one circumference, if the roughness detector 30 is moved a given pitch at a time along the vertical axis L (Z axis direction) as shown in FIG. 7 and the same operation is repeated, all area in the axial direction of the measurement face can be measured.

At this time, in the embodiment, the skid 37 includes a pair of skids 37A and 37B sandwiching the stylus 33 and projecting in the projection direction of the stylus 33. Thus, when the surface roughness is measured while the roughness detector 30 is moved a given pitch at a time in the direction of arrangement of the stylus 33 and the skids 37A and 37B (Z axis direction), one skid 37A or 37B is always in contact with the measurement face in the proximity of the boundary of the measurement area and thus a measurement-impossible area can be prevented from occurring. Therefore, the measurement area can be enlarged without re-positioning the measured substance W.

The tip of one skid 37A of the pair of skids 37A and 37B deviates in the displacement direction of the stylus 33 from the tip of the other skid 37B. Thus, only one skid comes in contact with the measurement face of the measured substance W during measuring and thus the adverse effect on the measurement waveform can be prevented.

Further, in the measurement of the surface roughness, the slide amount of the roughness detector 30 slid by the slide mechanism 53 is detected by the slide amount detector 54 and then is read into the controller 60.

Therefore, the controller 60 can precisely find the contour shape of the measured substance W based on the slide amount data from the slide amount detector 54. That is, according to the surface texture measuring device, the surface roughness data of the measurement face of the measured substance W and the contour shape of the measurement face can be measured at the same time from stylus tip position data obtained from the roughness detector 30 and roughness detector slide amount data obtained from the slide amount detector 54. For example, if the measured substance W is a cam, the surface roughness of the cam face and the contour shape of the cam face can be measured at the same time.

MODIFIED EXAMPLES

The invention is not limited to the embodiment described above and contains modifications, improvements, etc., in the range in which the object of the invention can be accomplished.

In the description of the embodiment, the surface roughness of the outer peripheral cam face of the plate cam (plane cam) is measured by way of example, but the embodiment can also be applied to measurement of the surface roughness of the end face cam face of an end face cam (solid cam), etc., as the measured substance W.

Figure 9:
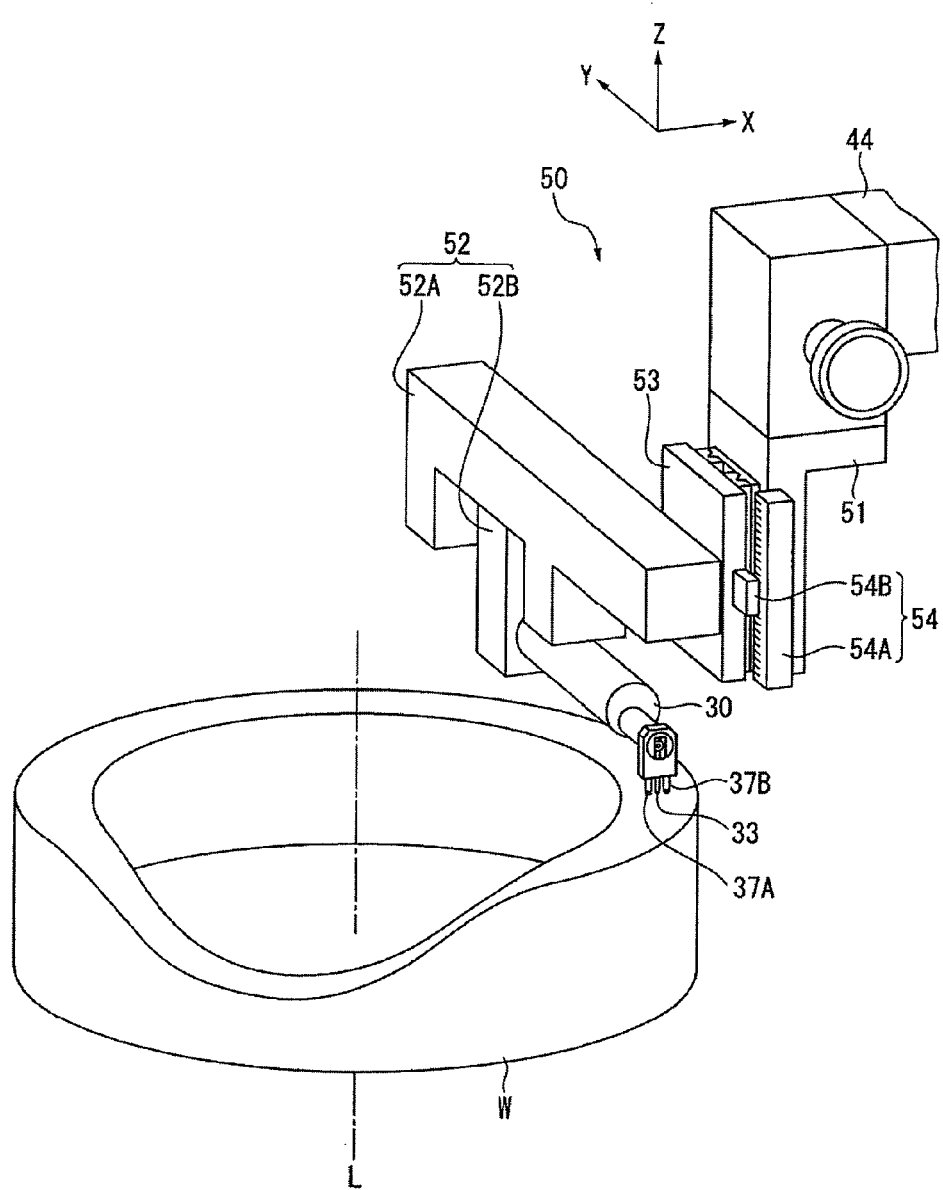
FIG. 9 is a perspective view to show a main portion of another embodiment of the invention.
Figure 10A:
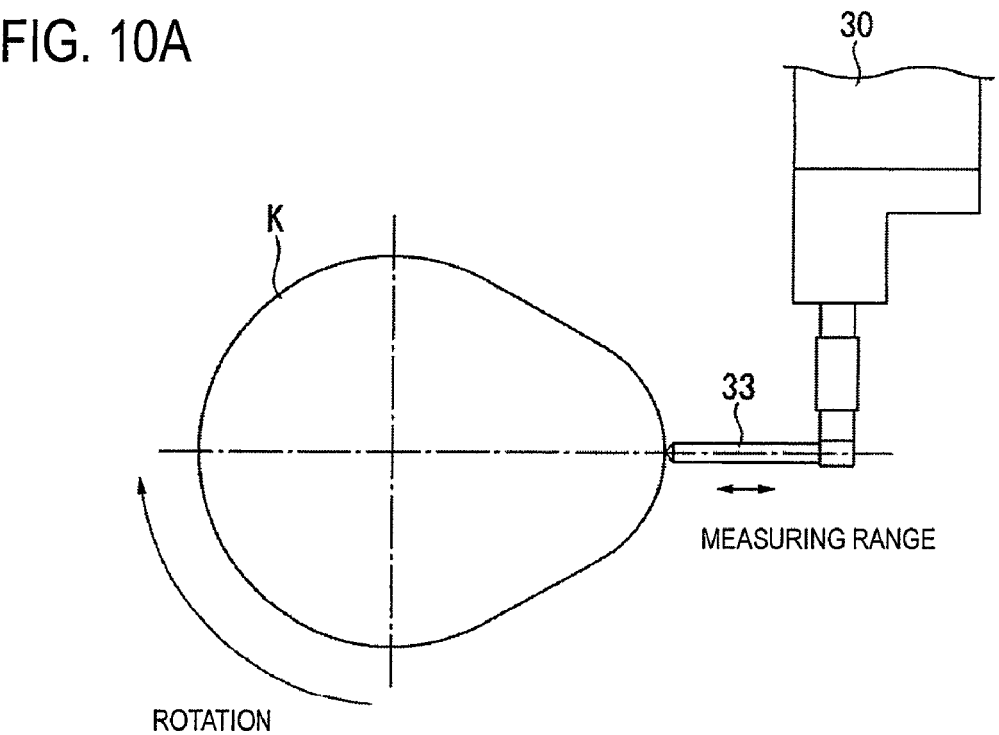
FIGS. 10A and 10B are plane views in a case where the surface roughness of a cam is measured using a roundness measuring device.
Figure 10B:
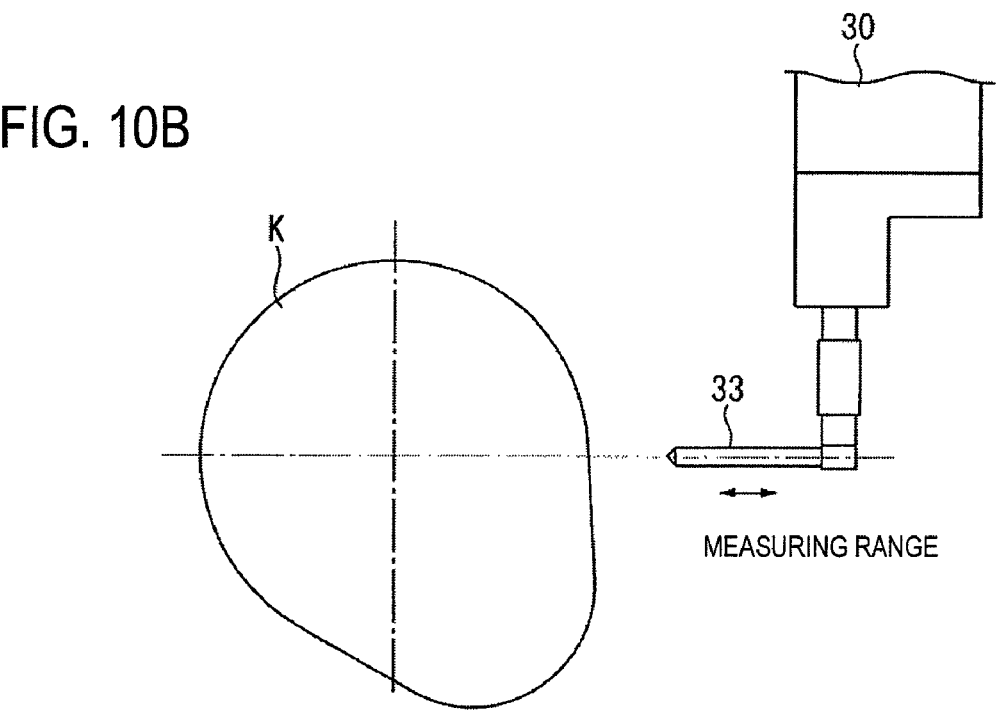
Figure 11:
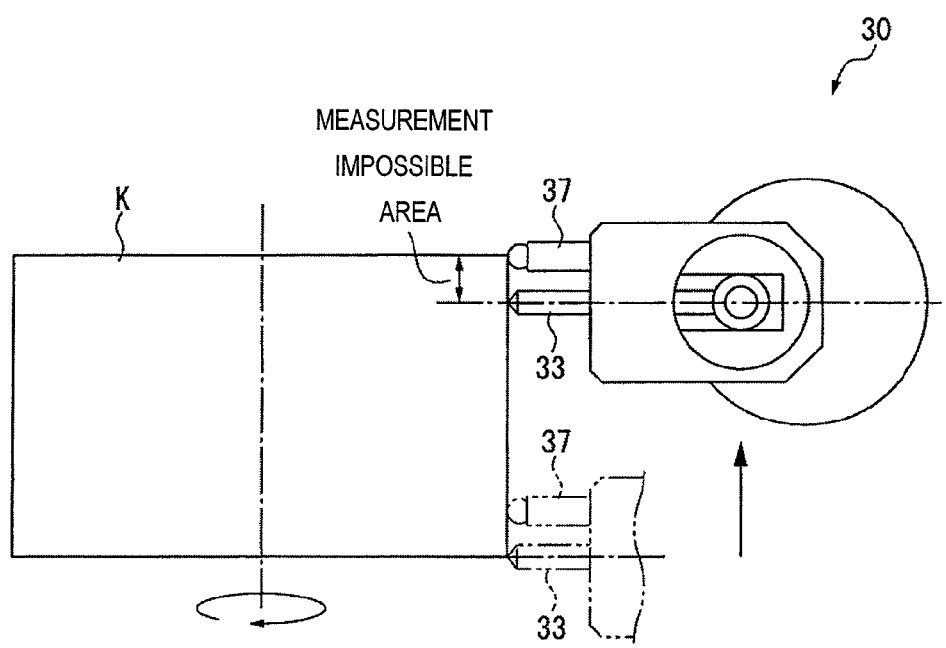
FIG. 11 is a view to show a problem in a case where the surface roughness of the cam using the roundness measuring device.

For example, as shown in FIG. 9, an end face cam (solid cam) as the measured substance W is set on the rotation table 20 (not shown) with the end face cam face of the end face cam (solid cam) upward and the roughness detector 30 is attached to the slide arm 44 so that the stylus 33 and the skids 37A and 37B become parallel with the vertical axis L. In this state, if the rotation table 20 is rotated, the surface roughness of the end face cam face of the end face cam (solid cam) can be measured.

The measured substance W is not limited to the cam and can be any other substance. Particularly, a shape with a comparatively large eccentricity amount from the rotation center to the measurement face, for example, a piston with the measurement face shaped like an ellipse or the like can be measured. Alternatively, a measured substance of a shape where the position of the measurement face largely fluctuates relative to the rotation angle can also be measured.

The embodiment is predicated on the roundness measuring device and the skids 37A and 37B and the slide mechanism 53 are added to the roundness measuring device to form the surface texture measuring device; however, the embodiment is not necessarily predicated on the roundness measuring device.

For example, in the roundness measuring device, the measured substance W is placed on the upper face of the rotation table 20 and is rotated with the vertical axis L as the center; however, the measured substance may be supported horizontally and may be rotated with the horizontal axis as the center. Thus means that the rotation driving device for rotating the measured substance W may rotate the measured substance W in any attitude.

In the embodiment, in the slide mechanism 53, for the guide member 53A, the slide member 53B is urged by the compression coil spring 53C so that the skids 37A and 37B always come in contact with the measurement face of the measured substance W, but the urging member for urging the slide member 53B is not limited to the compression coil spring 53C. For example, a helical extension spring, a leaf spring, etc., may be used.

In the embodiment, a pair of skids 37A and 37B is provided in the vicinity of the stylus 33, but the number of the skids is not limited to two. For example, the number of skid may be one.

The invention can be used to measure the surface roughness of a measured substance of a shape with a comparatively large eccentricity amount from the rotation center to the measurement face.

What is claimed is:

1. A surface texture measuring device, comprising:
   a rotation driving device configured to rotate a measured substance;
   a roughness detector including a detector main body and a stylus provided displaceably at a tip of the detector main body and configured to come in contact with a measurement face of the measured substance; and
   a detector driving device including a detector holder configured to hold the roughness detector, and being configured to drive the detector holder in a direction of bringing the detector holder close to or away from the rotation driving device,
   wherein the roughness detector has at least one skid provided at the tip of the detector main body and in the proximity of the stylus and configured to come in contact with the measurement face of the measured substance, and the roughness detector outputs displacement of the stylus based on the skid as an electric signal,
   wherein the detector holder includes a guide member driven by the detector driving device, a slide member configured to hold the roughness detector and provided slidably in a displacement direction of the stylus to the guide member, and an urging member configured to urge the slide member so that the at least one skid always comes in contact with the measurement face of the measured substance,
   wherein the at least one skid includes a pair of skids sandwiching the stylus and projecting in a projection direction of the stylus, and
   wherein a tip of one of the at least one skid of the pair of skids deviates in the displacement direction of the stylus from a tip of the other skid.

2. The surface texture measuring device as claimed in claim 1 wherein the detector holder includes a slide amount detector configured to detect a slide amount of the slide member.

3. The surface texture measuring device as claimed in claim 1 wherein the detector holder includes a slide amount detector configured to detect a slide amount of the slide member.

4. The surface texture measuring device as claimed in claim 1 wherein the detector holder includes a slide amount detector configured to detect a slide amount of the slide member.

5. The surface texture measuring device as claimed in claim 1 wherein the detector holder includes a slide amount detector configured to detect a slide amount of the slide member.

* * * * *